(12) United States Patent
Borschert et al.

(10) Patent No.: US 8,807,888 B2
(45) Date of Patent: Aug. 19, 2014

(54) ROTARY CUTTING TOOL, SUCH AS A DRILL, COMPRISING AN EXCHANGEABLE CUTTING INSERT, AND AN EXCHANGEABLE CUTTING INSERT

(71) Applicant: Kennametal, Inc., Latrobe, PA (US)

(72) Inventors: Bernhard Borschert, Bamberg (DE); Dieter Muhlfriedel, Ebermannstadt (DE); Jurgen Schwagerl, Vohenstrauss (DE); Ruy Frota de Souza, Jr., Latrobe, PA (US); Michael D. Shultz, Derry, PA (US); Michael R. McCormick, Greensburg, PA (US); Robert A. Erickson, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 13/756,990

(22) Filed: Feb. 1, 2013

(65) Prior Publication Data

US 2013/0209189 A1    Aug. 15, 2013

Related U.S. Application Data

(63) Continuation of application No. 12/847,216, filed on Jul. 30, 2010, now Pat. No. 8,366,358, and a continuation of application No. 12/047,904, filed on Mar. 13, 2008, now Pat. No. 7,832,967, and a continuation of application No. 10/921,781, filed on Aug. 19, 2004, now Pat. No. 7,360,974, which is a continuation-in-part of application No. PCT/EP03/01526, filed on Feb. 15, 2003.

(30) Foreign Application Priority Data

Feb. 21, 2002 (DE) .................................. 102 07 257

(51) Int. Cl.
*B23B 51/02*    (2006.01)
(52) U.S. Cl.
USPC ............ 408/226; 408/230; 408/231; 408/713
(58) Field of Classification Search
USPC .......................... 408/226, 227, 229–233, 713
IPC .............................................. B23B 51/00,51/02
See application file for complete search history.

(56) References Cited

U.S. PATENT DOCUMENTS

| 22,394 A | 12/1858 | White et al. |
| 932,071 A | 8/1909 | Urbscheit |

(Continued)

FOREIGN PATENT DOCUMENTS

| DE | 94 340 | 9/1896 |
| DE | 524 677 | 4/1931 |

(Continued)

*Primary Examiner* — Daniel Howell
(74) *Attorney, Agent, or Firm* — Larry R. Meenan, Esq.

(57) ABSTRACT

A tool shank for use with a cutting insert in a rotary cutting tool includes a body having, and adapted to be rotated about, a central longitudinal tool axis, the body having a tip portion structured to receive at least a portion of the cutting insert therein. The shank also includes a pair of chip flutes formed in the body and a pair of recesses, each recess bordering a respective chip flute. Each recess includes a rim portion extending perpendicular to the tool axis and a bearing surface extending at an incline relative to the tool axis. Each rim portion is adapted to engage a corresponding surface on the cutting insert. Each bearing surface is adapted to engage a corresponding bearing surface on the cutting insert in a manner such that the cutting insert is pulled against the body when the rotary cutting tool is rotated about the tool axis.

15 Claims, 4 Drawing Sheets

(56) References Cited

U.S. PATENT DOCUMENTS

| | | |
|---|---|---|
| 1,461,548 A | 10/1923 | West |
| 2,158,120 A | 5/1939 | Hirschberg |
| 2,294,969 A | 8/1942 | Engvall et al. |
| 3,153,356 A | 10/1964 | Dearborn |
| 3,293,727 A | 12/1966 | Simms |
| 3,359,837 A | 12/1967 | Andreasson |
| 3,548,688 A | 12/1970 | Kuch |
| 4,293,253 A | 10/1981 | Ott |
| 4,561,812 A | 12/1985 | Linden |
| 4,744,704 A | 5/1988 | Galvefors |
| 5,024,563 A | 6/1991 | Randall |
| 5,114,286 A | 5/1992 | Calkins |
| 5,154,549 A | 10/1992 | Isobe et al. |
| 5,154,550 A | 10/1992 | Isobe et al. |
| 5,228,812 A | 7/1993 | Naguchi et al. |
| 5,452,971 A | 9/1995 | Nevills |
| 5,649,794 A | 7/1997 | Kress et al. |
| 5,685,671 A | 11/1997 | Packer et al. |
| 5,863,162 A | 1/1999 | Karlsson et al. |
| 5,904,455 A | 5/1999 | Krenzer et al. |
| 5,957,631 A | 9/1999 | Hecht |
| 5,971,673 A | 10/1999 | Berglund et al. |
| 5,980,166 A | 11/1999 | Ogura |
| 5,988,953 A | 11/1999 | Berglund et al. |
| 6,012,881 A | 1/2000 | Scheer |
| 6,059,492 A | 5/2000 | Hecht |
| 6,071,045 A | 6/2000 | Janess |
| 6,109,841 A | 8/2000 | Johne |
| 6,276,879 B1 | 8/2001 | Hecht |
| 6,481,938 B2 | 11/2002 | Widin |
| 6,485,235 B1 | 11/2002 | Mast |
| 6,506,003 B1 | 1/2003 | Erickson |
| 6,514,019 B1 | 2/2003 | Schulz |
| 6,530,728 B2 | 3/2003 | Eriksson |
| 6,840,717 B2 | 1/2005 | Eriksson |
| 7,070,367 B2 | 7/2006 | Krenzer |
| 7,360,974 B2 * | 4/2008 | Borschert et al. ............. 408/231 |
| 7,832,967 B2 | 11/2010 | Borschert et al. |
| 8,366,358 B2 * | 2/2013 | Borschert et al. ............. 408/231 |
| 2002/0159851 A1 | 10/2002 | Krenzer |
| 2006/0072976 A1 | 4/2006 | Frota De Souza |
| 2006/0093449 A1 | 5/2006 | Hecht et al. |

FOREIGN PATENT DOCUMENTS

| | | |
|---|---|---|
| DE | 196 05 157 | 9/1996 |
| DE | 195 43 233 | 5/1997 |
| DE | 199 45 097 | 3/2001 |
| EP | 0 118 806 | 9/1984 |
| EP | 1 136 161 | 9/2001 |
| FR | 907 980 | 3/1946 |
| GB | 17961 A | 0/1915 |
| GB | 1 395 855 | 5/1975 |
| WO | 84 03241 | 8/1984 |

* cited by examiner

ROTARY CUTTING TOOL, SUCH AS A DRILL, COMPRISING AN EXCHANGEABLE CUTTING INSERT, AND AN EXCHANGEABLE CUTTING INSERT

CONTINUING APPLICATION DATA

This application is a continuation of co-pending U.S. application Ser. No. 12/847,216, filed on Jul. 30, 2010, which is a continuation of U.S. application Ser. No. 12/047,904 (now U.S. Pat. No. 7,832,967), filed on Mar. 13, 2008, which is a continuation of U.S. application Ser. No. 10/921,781 (now U.S. Pat. No. 7,360,974), filed on Aug. 19, 2004, which is a Continuation-In-Part application of International Patent Application No. PCT/EP03/01526, filed on Feb. 15, 2003, which claims priority from Federal Republic of Germany Patent Application No. 102 07 257.4, filed on Feb. 21, 2002. International Patent Application No. PCT/EP03/01526 was pending as of the filing date of U.S. application Ser. No. 10/921,781. The United States was an elected state in International Patent Application No. PCT/EP03/01526.

BACKGROUND

1. Field of the Invention

This application relates to a rotary cutting tool, especially a drilling tool, composed of a tool shank and an exchangeable cutting insert.

2. Background Information

A drilling tool comprising an exchangeable cutting insert is known from EP 0 118 806 B1, for example. Said drilling tool may have a tool shank with an accommodation for inserting a fastening pin of the cutting insert. When the cutting insert is inserted, it may be rotated by an angle of approx. 45° relative to the tool shank. No other fastening element may be provided. The cutting insert and the tool body could be configured such that the shank-end narrow side of the cutting plate may be braced against the shank-end rim of the recess in the tool shank. An axial force between the tool shank and the cutting insert can be produced in that the shank-end rim of the recess may rise slightly in the direction of insertion. The fastening pin can be secured against being pulled out of the tool shank by means of a shank-end widening. This may cause bracing when the cutting insert is rotated into the seat, which may be intensified by cutting at higher cutting forces. The axial force generated by such bracing may pull the cutting insert away from the tool body. The stability of the mount of the cutting insert on the tool shank and the mechanical load capacity of the drilling tool overall may be restricted thereby.

According to another embodiment of the cutting tool known from EP 0 118 806 B1, the fastening pin may be disposed concentrically on the cutting insert and may be provided with bearing surfaces rising slightly twisting in the direction of the cutting rotation. By said slightly twisting configuration of the bearing surfaces on the fastening pin, which can be in contact with correspondingly formed bearing surfaces on the seat for the tool shank, an axial force may be applied on the cutting insert in the direction toward the tool body. Said axial force may act fully on the fastening pin, which may be small in size compared to the tool diameter and thus may have a low mechanical load capacity.

Additionally, a torque may be applied to the fastening pin, which may further reduce the mechanical load capacity of the connection between the tool shank and the cutting insert.

OBJECT OR OBJECTS

One possible objective is to provide a rotary cutting tool composed of a tool shank and a cutting insert with no other fastening elements, especially a drilling tool, where the connection between the tool shank and the cutting insert is especially stable and has a high load capacity.

SUMMARY

The problem may be solved in accordance with at least one possible embodiment of the present application. The tool shank of a rotary cutting tool with an exchangeable cutting insert may be provided on the tool circumference with a limb that may be advantageously inclining overall relative to the tool axis. A correspondingly inclining bearing surface of a wing of the cutting insert can engage in said limb or guiding tab. When the cutting insert is rotated into the tool shank, the inclining bearing surfaces on the tool circumference may produce a force that could press the cutting insert against the tool shank. Said axial pressing force may increase when the tool is used at increasing cutting forces. For transferring the torque between the cutting insert and the tool shank, the outside diameter region of the cutting insert or the tool shank, respectively, may be available. The arrangement of the bearing surfaces on the tool circumference may limit the forces required for transferring the torque between the tool shank and the cutting insert to the lowest possible level.

The cutting insert may only partly cover the tool shank at the tip. In particular, the limb of the tool shank may not or may only partly be covered by the cutting insert at the tip. Therefore, the bearing surface of the cutting insert can extend virtually over its total height, except for the fastening pin. This can ensure an especially large-surfaced force and torque transfer between the cutting insert and the tool body. The limb provided for transferring the torque on the circumference of the tool body may advantageously extend virtually over the total height of the wing of the cutting insert so that the wing could rise only slightly above the limb at the tip of the shank.

Advantageously, the diameter of the cutting element can be slightly greater than the diameter of the tool shank, which may be a simple method to ensure that only the cutting insert will touch the surface of the work piece during machining.

When the cutting insert could be inserted in the tool shank, it may initially be inserted with the fastening pin in a location opening and then rotated, similar to a bayonet joint. According to an advantageous further development to secure a defined axial position of the cutting insert relative to the tool shank after inserting the cutting insert and before rotating, both the tool shank and the cutting insert may be provided with a guiding step.

The axial force pulling the cutting insert in the direction of the tool body may be dependent upon the angle of contact of the bearing surfaces of the cutting insert and the tool shank relative to the tool axis. Both an adequately high axial force and a stable design of the limb of the tool shank and the wing of the cutting insert may be advantageously obtained by an angle of contact of at least 15° and at most 60°, preferably 30°. In case the chucking groove or chip flute is twisted, the angle of contact advantageously may correspond to the angle of twist of the chucking groove.

The fastening pin and the corresponding accommodation in the tool shank may be advantageously configured such that the fastening pin can be braced when the cutting insert may be rotated into the tool shank. To this aim, the fastening pin may have an elliptical cross-section, while the location opening may have a circular cross-section. An elliptical configuration of the fastening pin only may be advantageous in that in manufacturing the tool, only one outside contour, namely on the cutting insert, may have to be elliptical, while an elliptical boring, which could be technically very difficult to do, may not be necessary.

Instead of a substantially cylindrical pin, possibly with a slightly elliptical cross-section, the cutting insert can also have a pin in conical form. The accommodation of the tool shank, which may be conical in this case, can have a circular cross-section slightly varying from the cross-section of the pin, which may also be advantageous with regard to manufacturing. The pin can taper conically downward, which could mean toward the tool shank, making it especially easy to insert the pin in the tool shank, or alternatively, it may widen downward, which, combined with the elliptical cross-section may intensify the bracing of the cutting insert in the tool shank. Inserting and bracing the cutting insert in the tool shank may be easily possible in either case because the location opening of the tool shank could be open on the chucking grooves or chip flutes.

According to an advantageous further development, both the limb of the tool shank and the wing of the cutting insert may have a supplemental bearing surface in addition to the bearing surface, opposite the bearing surface and inclined relative to the tool axis. Said supplemental bearing surfaces may advantageously join the bearing surfaces, and a transitional area that may be small relative to the bearing surfaces and the supplemental bearing surfaces can be provided between said surfaces. If the bearing surfaces may be facing the tip of the tool and the supplemental bearing surfaces may be facing the tool shank the transitional area between the limbs and the adjacent region of the tool shank, which can be under particular mechanical stress when the tool is used as intended, could be specifically reinforced. Overall, the bearing surfaces and supplemental bearing surfaces may form a large-surfaced area of contact for transferring force and torque between the tool shank and the cutting insert. Both the bearing surfaces and the supplemental bearing surfaces can border on the tool circumference, except for any beveled edges that may be provided on the individual surfaces, so that with regard to transferring the torque, the geometric conditions may be especially favorable.

Similar to the bearing surfaces that advantageously could have an angle of contact between 15° and 60° relative to the tool axis, the supplemental bearing surfaces may be advantageously inclined at a supplemental angle of contact between −10° and −60° relative to the tool axis.

Advantageously, the supplemental bearing surfaces can be inclined by a lesser angular amount than the bearing surfaces.

While the bearing surfaces generate an axial force that pulls the cutting insert toward the tool shank, the supplemental bearing surfaces may produce an axial force in opposite direction. In order to ensure that a resulting force holds the cutting insert against the tool shank, the so-called height of contact, relative to the tool axis, over which the bearing surface of the limb extends, advantageously may be greater than the so-called counter-height of contact over which the supplemental bearing surface of the limb extends. The equivalent may be true for the bearing surface and the supplemental bearing surface on the wing of the cutting insert. Therefore, the varying dimensions between the bearing surfaces on the one hand and the supplemental bearing surfaces on the other hand could have the same effect as the variation in the inclination of the various surfaces, namely generating a resulting attracting force between the tool shank and the cutting insert when the tool may be in operation.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

An exemplary embodiment is explained below in greater detail by means of the drawings, as follows.

DESCRIPTION OF EMBODIMENT OR EMBODIMENTS

Identical parts are provided with the same reference number in all drawings.

Figure 1:
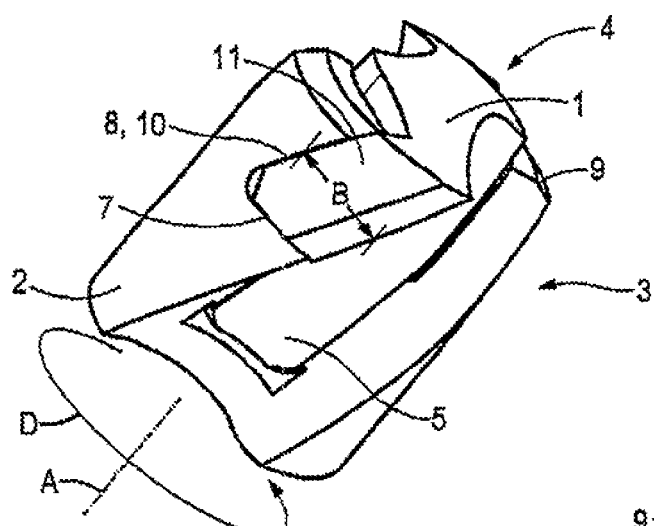
FIG. 1 shows a rotary cutting tool composed of a tool shank and a cutting insert.
Figure 2:
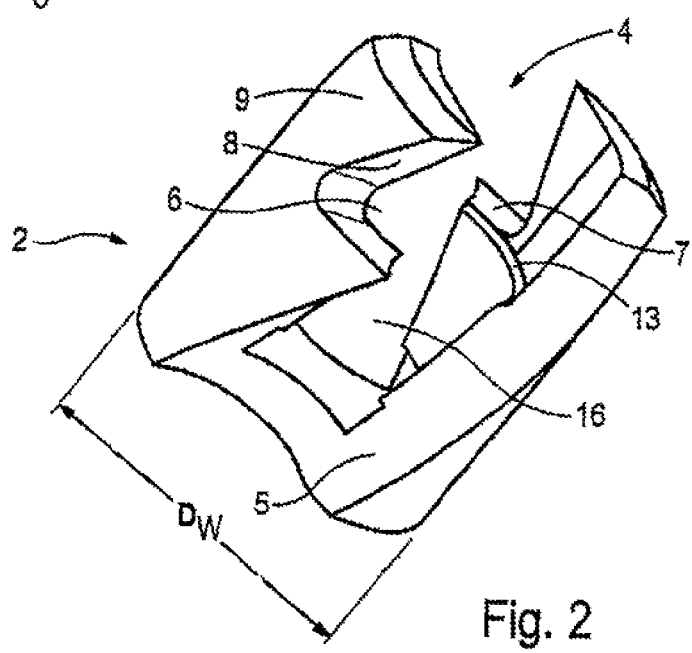
FIG. 2 shows the tool shank of the rotary cutting tool of FIG. 1.
Figure 3:
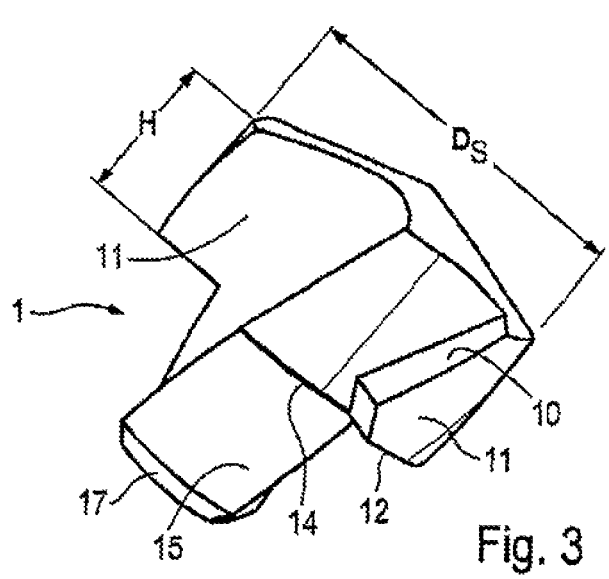
FIG. 3 shows the cutting insert of the rotary cutting tool of FIG. 1.

FIGS. 1 to 3 show a perspective view of a cutting element or cutting insert 1 and a drill shank or tool shank 2 of a rotary cutting tool 3 in the form of a drilling tool. A recessing, milling or reaming tool, for example, may be similarly configured. Especially hard metal, cermet, ceramic and HSS, either coated or uncoated, are the materials used for the cutting insert 1. It is possible to provide a cutting insert 1 with PCD or CBN. The cutting insert 1 is finished either conventionally by polishing, for example, or by means of the so-called "metal injecting molding" (MIM) method. The cutting insert 1 is inserted into the tool shank 3 at the tip 4 of the shank. Both for inserting and releasing the cutting insert 1 from the tool shank 2 a key (not shown) is used. The direction of rotation of the tool is identified by D, the tool or drill axis is identified by A. The tool shank 2, advantageously made of steel or hard metal, is provided with two twisted chucking grooves or chip flutes 5 that extend from a tool seat (not shown) to the tip 4 of the shank. As an alternative to the two twisted chucking grooves 5, the tool shank 2 can also be provided with a different quantity of straight or twisted chucking grooves. Two recesses 6 bordering on the chucking grooves 5 at the tip 4 of the shank each have a rim 7 that extends perpendicular to the tool axis A and a bearing surface 8 extending at an incline relative to the tool axis A. The bearing surface 8 delimits a limb 9 on the circumference of the tool shank 2. When the tool 3 is assembled, a bearing surface 10 of a wing 11 of the cutting insert 1 rests against the bearing surface 8 of the limb 9. The bearing surfaces 8, 10 are inclined relative to the tool axis A in such a way that the cutting insert 1 is pulled against the tool shank 2 when the rotary cutting tool 3 rotates in the direction of rotation D of the tool. The inclination of the bearing surfaces 8, 10 relative to the tool axis A corresponds to the angle of twist of the chucking grooves 5. Therefore, the wings 11 of the cutting insert 1 have a constant width B along the tool axis A over virtually the entire height H.

The wings 11 of the cutting insert 1 rise slightly above the tool shank 2 at the tip 4 of the shank. The limbs 9 are not covered by the cutting insert 1 at the tip 4 of the shank. The diameter $D_s$ of the cutting element of the cutting insert 1 is slightly greater than the diameter $D_w$ of the tool shank. The transition between the rim 7 of the tool shank 2 and the adjacent bearing surface 8 of the limb 9 is rounded so as to prevent mechanical stress peaks. The shank-end narrow side 12 of the cutting insert 1 rests against the rim 7. When the cutting insert 1 is inserted in the tool shank 2 and before it is tightened, said bearing surface 8 is not available for positioning the cutting insert 1. In order to define the position of the cutting insert 1 before it is tightened a guiding step 13 is provided on the tool shank 2 adjacent to the limbs 9 and a corresponding guiding step 14 is provided on the cutting insert 1. A fastening pin 15 borders on the guiding step 14 of the cutting insert 1. Said pin is accommodated in a location opening 16 in the tool shank 2. The recess 6 provided on the tip 4 of the shank and on the tool circumference combined with the adjacent location opening 16 forms a space for inserting the cutting insert 1, including the fastening pin 15, in the tool shank 2. The fastening pin 15 has a beveled edge 17 so as to facilitate insertion into the location opening 16. The location opening 16 is disposed concentric to the tool axis A and has a circular cross-section, while the cross-section may vary along the tool axis A. Alternatively, the cylindrical location opening 16 may also be configured conical, especially tapering downward, which means away from the tip 4 of the shank. In the reverse case, where a location opening 16 conically widens downward, the cutting insert 1 is further secured against falling out or being pulled out of the tool shank 2. The location opening 16 is open to the chucking grooves 5 so that it is easy to insert the cutting insert 1 in the tool shank 2 in any case. The cutting insert 1 can easily be centered with any configuration of the fastening pin 15 and the location opening 16.

Figure 4:
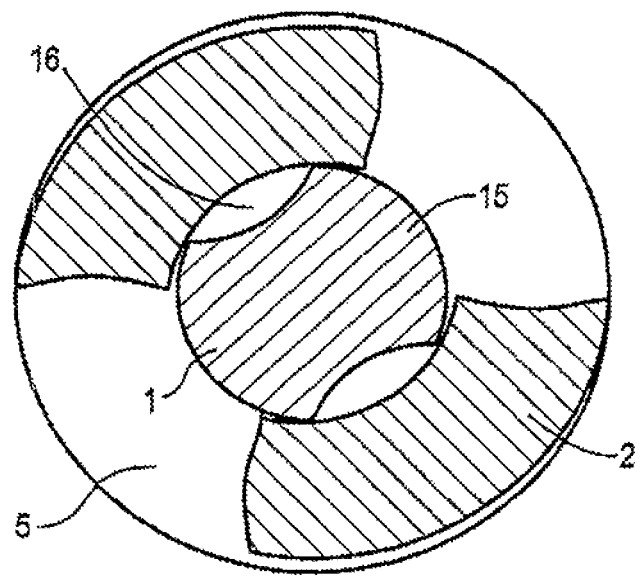
FIG. 4 shows the tool shank with the released fastening pin of the cutting insert, in cross-section.
Figure 5:
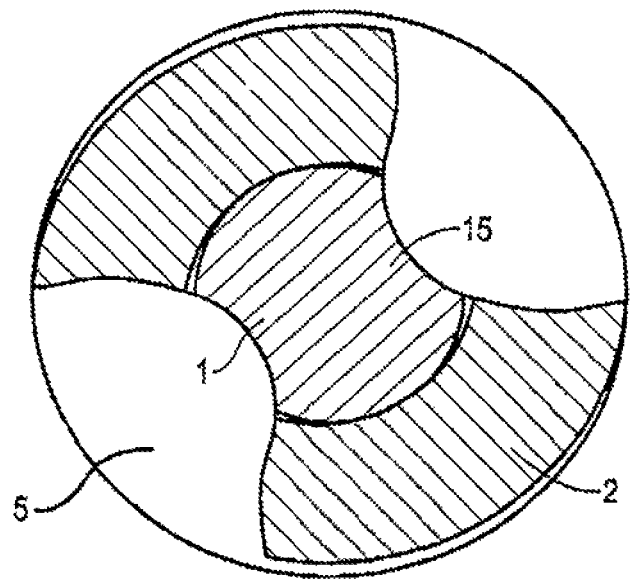
FIG. 5 shows the tool shank with the braced fastening pin of the cutting insert, in cross-section.
Figure 6:
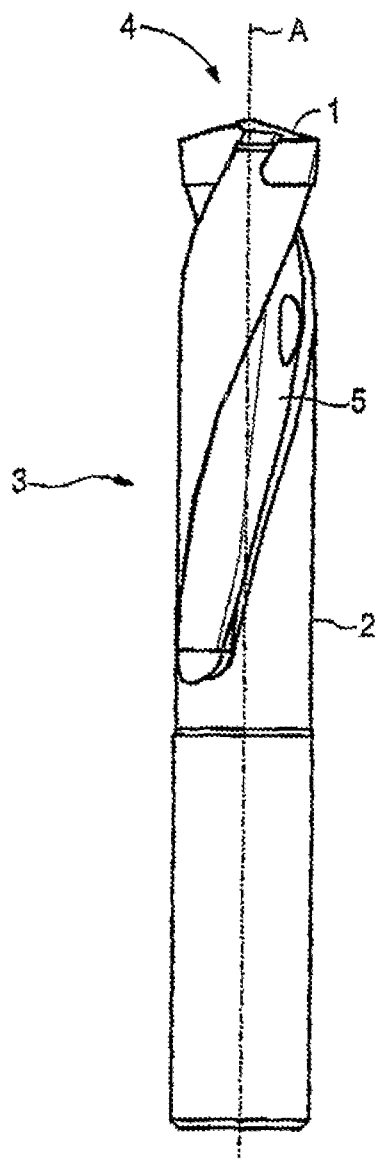
FIG. 6 shows an alternative embodiment of a rotary cutting tool composed of a tool shank and a cutting insert.
Figure 7:
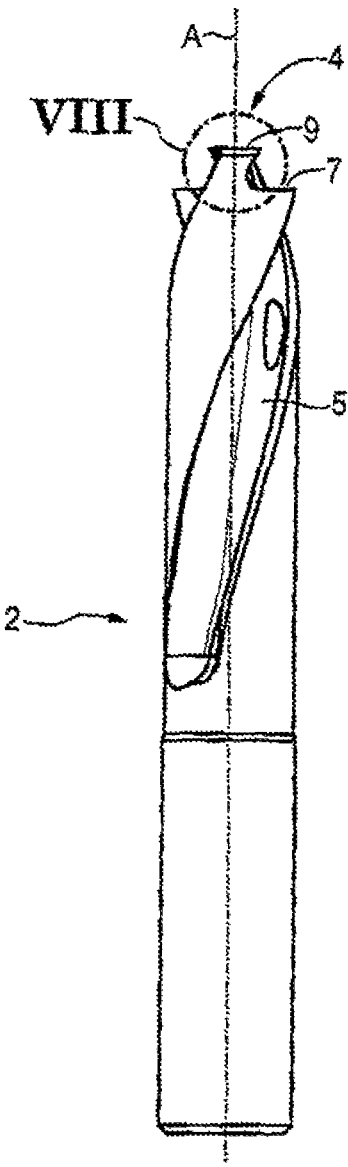
FIG. 7 shows the tool shank of the rotary cutting tool of FIG. 6.
Figure 8:
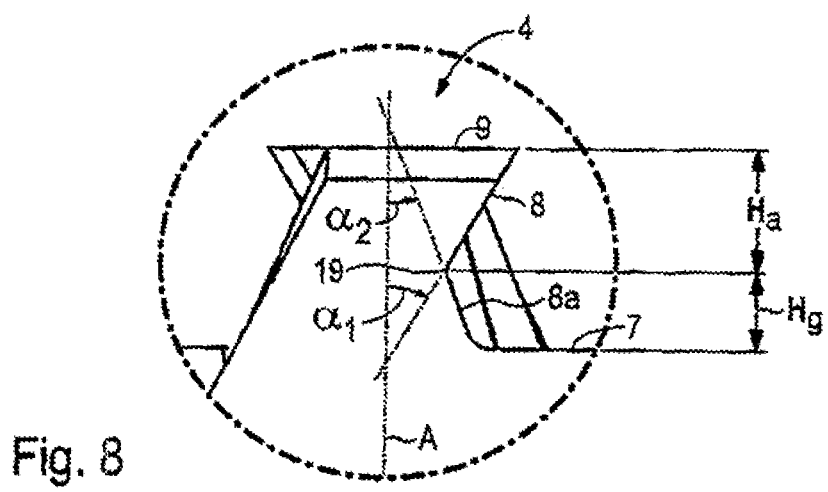
FIG. 8 shows the tool shank of FIG. 7 in detail.
Figure 9:
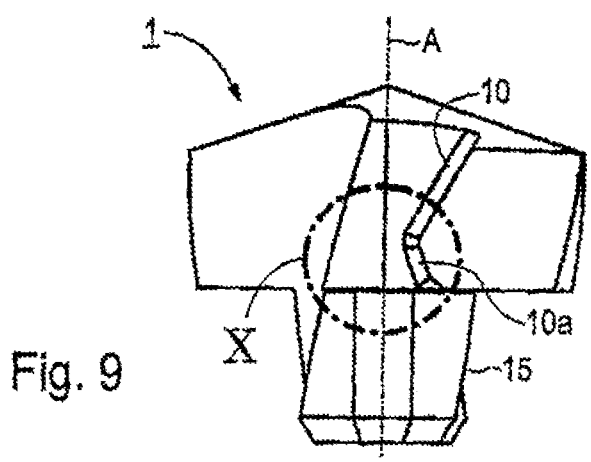
FIG. 9 shows the cutting insert of the rotary cutting tool of FIG. 6.
Figure 10:
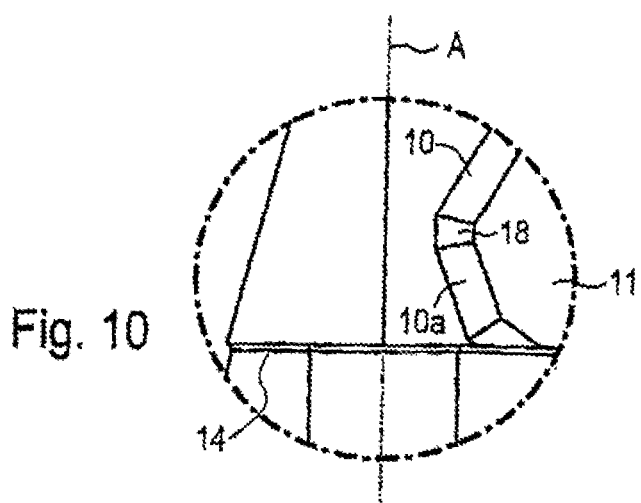
FIG. 10 shows the cutting insert of FIG. 9 in detail.

FIGS. 4 and 5 show the tool shank 2 in cross-section with the fastening pin 15 inserted in the location opening 16, both in released and braced position. According to this advantageous embodiment, the fastening pin 15 has a slightly elliptical cross-section.

As a result of the elliptical cross-section, the fastening pin 15 has some play when it is inserted in the location opening 16. By rotating the cutting insert 1 by approx. 45°, the fastening pin 15 is braced in the location opening 16. The fastening pin 15 is laterally cut in such a way that it adapts to the form of the chucking grooves 5 when it is braced. Instead of the elliptical cross-section, the fastening pin 15 and/or the location opening 16 can also have another, non-circular cross-section by means of which the fastening pin 15 can be braced in the location opening 16 of the tool shank 2. Such cross-sectional configurations are known, for example, in relation to a bracing means according to DE 199 45 097 A1 for connecting a shaft with a hub so as to be rotation-proof and thrust-proof.

The slightly elliptical configuration of the cross-section of the fastening pin 15 can be achieved both with a cylindrical basic form of the fastening pin 15 and with a conical configuration of the location opening 16 and the fastening pin 15. In the case where the location opening 16 conically widens downward and at the same time, the fastening pin 15, which is also conical overall, has an elliptical cross-section an axial force is produced when the fastening pin 15 is rotated into the location opening 16. Said axial force pulls the fastening pin 15 into the location opening 16 and thus supports the axial force holding the cutting insert 1 on the tool shank 2 by means of the bearing surfaces 8, 10.

FIGS. 6 to 10 illustrate an advantageous alternative embodiment of a rotary cutting tool in the form of a drilling tool 3 and the tool shank 2 or the cutting insert 1 of the drilling tool 3. In this case, the limb 9 of the tool shank 2 is provided with a supplemental bearing surface 8a in addition to the bearing surface 8. Similarly, the wing 11 of the cutting insert 1 is provided with a supplemental bearing surface 10a that corresponds to the supplemental bearing surface 8a of the tool shank 2. Otherwise, the configuration of the rotary cutting tool 1 in accordance with said second exemplary embodiment substantially corresponds to the configuration of the first exemplary embodiment. Both supplemental bearing surfaces 8a, 10a are inclined relative to the tool axis A opposite the bearing surfaces 8, 10. Between the bearing surface 10 and the supplemental bearing surface 10a of the wing 11, a transitional area 18 extends approximately parallel to the tool axis A.

In contrast, the bearing surface 8 is connected to the supplemental bearing surface 8a of the limb 9 merely by a rounding 19. Therefore, when the cutting insert 1 is inserted in the tool shank 2, the transitional area 18 does not rest on the tool shank 2. Therefore, the rotation of the cutting insert 1 relative to the tool shank 2 when the tool 3 is assembled is not limited by the transitional area 18, but merely by the bearing surfaces and supplemental bearing surfaces 8, 10, 8a, 10a.

The bearing surface 8 of the limb 9, relative to the tool axis A, extends over a height of contact $H_a$. The height over which the supplemental bearing surface 8a extends is called the counter-height of contact $H_g$. The amount of the height of contact $H_a$ exceeds the amount of the counter-height of contact $H_g$ by approx. 50%. With the tool axis A, the bearing surface 8a encompasses an angle of contact $\alpha_1$ and the supplemental bearing surface 8a encompasses a supplemental angle of contact $\alpha_2$. The amount of the supplemental angle of contact $\alpha_2$ is less than the amount of the angle of contact $\alpha_1$. In the illustrated exemplary embodiment, the angle of contact $\alpha_1$ is 30° and the supplemental angle of contact $\alpha_2$ is 20°. In addition to the lesser height of the supplemental bearing surface 8a compared to the bearing surface 8, said difference is also a reason why the axial force pulling the cutting insert 1 away from the tool shank 2 by the inclination of the supplemental bearing surface 8a and the corresponding supplemental bearing surface 10a of the cutting insert 1 is lower than the opposite axial force based on the inclination of the bearing surfaces 8, 10. Therefore, when a work piece is machined with the tool 3, a resulting remaining force pulls the cutting insert 1 against the tool shank 2.

By the inclining supplemental bearing surface 8a of the limb 9 opposite the bearing surface 8, the tool shank 2 is reinforced in the transition between the limb 9 and the adjacent region of the tool shank 2, which is especially highly stressed by cutting. At the same time, the stability of the cutting insert 1 is not negatively affected by the supplemental bearing surface 10a on its wing 11. Also, the possibility of easily inserting and removing the cutting insert 1 from the tool shank 2 is not affected by the supplemental bearing surfaces 8a, 10a.

One feature or aspect of an embodiment is believed at the time of the filing of this patent application to possibly reside broadly in a rotary cutting tool composed of a tool shank with at least one chucking groove or chip flute and an exchangeable cutting insert with a recess for accommodating the cutting insert at the tip of the shank and in the wall of the chucking groove delimited on the shank-end by a rim against which the shank-end narrow side of the cutting insert rests and the cutting insert is provided with a fastening pin that is accommodated in a location opening of the tool shank, which is concentric relative to the tool axis, characterized in that the tool shank, on its circumference, is provided with a limb with a bearing surface bordering on the circumference of the tool shank and inclined relative to the tool axis and corresponding to a likewise inclined bearing surface on a wing of the cutting insert, where the orientation of the inclination of the bearing surfaces corresponds to the direction of rotation of the tool, and the cutting insert only partly covers the tip of the tool shank.

Yet another feature or aspect of an embodiment is believed at the time of the filing of this patent application to possibly reside broadly in a rotary cutting tool, characterized in that the diameter of the cutting element is greater than the diameter of the tool shank.

Still another feature or aspect of an embodiment is believed at the time of the filing of this patent application to possibly reside broadly in a rotary cutting tool, characterized by a guiding step on the tool shank and a corresponding guiding step on the cutting insert.

A further feature or aspect of an embodiment is believed at the time of the filing of this patent application to possibly reside broadly in a rotary cutting tool, characterized in that bearing surfaces, relative to the tool axis, have an angle of contact of at least 15° and at most 60°.

Another feature or aspect of an embodiment is believed at the time of the filing of this patent application to possibly reside broadly in a rotary cutting tool, characterized in that the angle of twist of the chucking groove corresponds to the angle of contact of the bearing surfaces.

Yet another feature or aspect of an embodiment is believed at the time of the filing of this patent application to possibly reside broadly in a rotary cutting tool, characterized in that the fastening pin is substantially cylindrical.

Still another feature or aspect of an embodiment is believed at the time of the filing of this patent application to possibly reside broadly in a rotary cutting tool, characterized in that the fastening pin is substantially conical.

A further feature or aspect of an embodiment is believed at the time of the filing of this patent application to possibly reside broadly in a rotary cutting tool, characterized in that the fastening pin has an elliptical cross-section.

Another feature or aspect of an embodiment is believed at the time of the filing of this patent application to possibly reside broadly in a rotary cutting tool, characterized by a supplemental bearing surface on the limb which is inclining relative to the tool axis opposite the bearing surface of the limb and corresponding with a supplemental bearing surface on the wing of the cutting insert.

Yet another feature or aspect of an embodiment is believed at the time of the filing of this patent application to possibly reside broadly in a rotary cutting tool, characterized in that the bearing surface on the wing of the cutting insert is facing the tip of the shank and the supplemental bearing surface on the wing of the cutting insert is facing the fastening pin.

A further feature or aspect of an embodiment is believed at the time of the filing of this patent application to possibly reside broadly in a rotary cutting tool, characterized in that the supplemental bearing surfaces, relative to the tool axis, have a supplemental angle of contact in the range between −10° and −60°.

Yet another feature or aspect of an embodiment is believed at the time of the filing of this patent application to possibly reside broadly in a rotary cutting tool, characterized in that the amount of the angle of contact of the bearing surfaces exceeds the amount of the supplemental angle of contact of the supplemental bearing surfaces.

Still another feature or aspect of an embodiment is believed at the time of the filing of this patent application to possibly reside broadly in a rotary cutting tool, characterized in that a height of contact over which the bearing surface of the limb extends relative to the tool axis is greater than a counter-height of contact over which the supplemental bearing surface of the limb extends relative to the tool axis.

Another feature or aspect of an embodiment is believed at the time of the filing of this patent application to possibly reside broadly in a cutting insert for a rotary cutting tool.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

A further feature or aspect of an embodiment is believed at the time of the filing of this patent application to possibly reside broadly in a rotary cutting tool that is composed of a tool shank with at least one chucking groove or chip flute and one exchangeable cutting insert. At the tip of the shank as well as in the wall of the chucking groove, a recess for accommodating the cutting insert is provided and delimited on the shank end by a rim against which the shank-end narrow side of the cutting insert rests. The cutting insert comprises a fastening pin which is accommodated in a location opening of the tool shank that is concentric to the tool axis. The tool shank, on its circumference, has a limb with a bearing surface that is inclined relative to the tool axis and that corresponds to a likewise inclined bearing surface on a wing of the cutting insert. The orientation of the inclination of the bearing surfaces corresponds to the direction of rotation of the tool. The inclination of the bearing surfaces produces an axial force that retains the cutting insert on the tool shank.

Another feature or aspect of an embodiment is believed at the time of the filing of this patent application to possibly reside broadly in a rotary cutting tool, such as a drill, having a central longitudinal axis, said rotary cutting tool comprising: a tool shank comprising at least one chip flute; said tool shank having a first end portion being configured to be inserted into a tool holder; said tool shank having a second end portion disposed opposite said first end portion; said second end portion comprising a replaceable cutting insert being configured to cut an object; said second end portion comprising a recess being configured and disposed to receive and hold said cutting insert; said recess comprising a central opening disposed concentric to said central longitudinal axis;

said cutting insert comprising a fastening pin being inserted and retained in said central opening; said second end portion comprising a limb disposed about said recess; said limb having an outer surface, an inner surface, and an end face, said inner surface forming a portion of said recess; said limb comprising a rim surface disposed between and transverse to said outer surface and said inner surface, and disposed a distance from said end face; said cutting insert comprising a support surface disposed about said fastening pin; said support surface being configured and disposed to rest against said rim surface; said limb comprising a bearing surface disposed between and transverse to said outer surface and said inner surface; said bearing surface being inclined at an angle with respect to said central longitudinal axis and being disposed between said rim surface and said end face; said cutting insert comprising an inclined bearing surface corresponding to said inclined bearing surface of said limb; each of said inclined bearing surfaces being inclined toward the direction of rotation of the rotary cutting tool to hold said cutting insert in said recess during cutting of an object; said second end portion having a tip; and said cutting insert being configured and disposed to form only a portion of said tip.

Yet another feature or aspect of an embodiment is believed at the time of the filing of this patent application to possibly reside broadly in a replaceable drill cutting insert for use in a drill having a central longitudinal axis and at least one chip flute, said cutting insert comprising: an elongated portion being configured to be inserted into and retained in a central opening in a shank of a drill; an inclined bearing surface being configured to engage with a corresponding inclined surface in a peripheral side of a recess of a shank of a drill; and said inclined bearing surface being inclined at an angle to hold said cutting insert in a recess of a shank of a drill during drilling of an object; and said cutting insert being configured to be disposed in a drill to form only a portion of a cutting end of a drill.

The appended drawings in their entirety, including all dimensions, proportions and/or shapes in at least one embodiment, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

The corresponding foreign and international patent publication applications, namely, Federal Republic of Germany Patent Application No. 102 07 257.4, filed on Feb. 21, 2002, having inventors Bernhard BORSCHERT, Dieter MUHLFRIEDEL, and Jurgen SCHWAGERL, and DE-OS 102 07 257.4 and DE-PS 102 07 257.4, and International Application No. PCT/EP03/01526, filed on Feb. 15, 2003, having WIPO Publication No. WO03/070408 and inventors Bernhard BORSCHERT, Dieter MOHLFRIEDEL, Jurgen SCHWAGERL, Ruy FROTA DE SOUZA, FILHO, Michael D. SHULTZ, and Michael R. MCCORMICK, as well as their published equivalents, and other equivalents or corresponding applications, if any, in corresponding cases in the Federal Republic of Germany and elsewhere, are hereby incorporated by reference as if set forth in their entirety herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

What is claimed is:

1. A tool shank for use with a cutting insert in a rotary cutting tool, the tool shank comprising:
   a body having, and adapted to be rotated about, a central longitudinal tool axis, the body having a tip portion structured to receive at least a portion of the cutting insert therein;
   a pair of chip flutes formed in the body; and
   a pair of recesses, each recess bordering a respective chip flute, each recess having:
      a rim portion extending perpendicular to the tool axis, and
      a bearing surface extending at an incline relative to the tool axis,
   wherein each rim portion is adapted to engage a corresponding surface on the cutting insert,
   wherein each bearing surface is adapted to engage a corresponding bearing surface on the cutting insert in a manner such that the cutting insert is pulled against the body when the rotary cutting tool is rotated about the tool axis, and
   wherein each chip flute is disposed at a twist angle and wherein each bearing surface is inclined at an angle corresponding to the twist angle.

2. The tool shank of claim 1 wherein the body comprises a location opening extending into the body from the tip and wherein the location opening is adapted to receive a fastening pin extending from the cutting insert.

3. The tool shank of claim 2 wherein the location opening is disposed concentric to the tool axis and has a circular cross-section when viewed along the tool axis.

4. The tool shank of claim 3 wherein the location opening is generally cylindrical in shape.

5. The tool shank of claim 3 wherein the location opening is conical in shape.

6. The tool shank of claim 2 wherein the location opening is disposed concentric to the tool axis and has a non-circular cross-section when viewed along the tool axis.

7. A tool shank for use with a cutting insert in a rotary cutting tool, the tool shank comprising:
   a body having, and adapted to be rotated about, a central longitudinal tool axis, the body having a tip portion structured to receive at least a portion of the cutting insert therein;
   a pair of chip flutes formed in the body; and
   a pair of recesses, each recess bordering a respective chip flute, each recess having:
      a rim portion extending perpendicular to the tool axis, and
      a bearing surface extending at an incline relative to the tool axis,
   wherein each rim portion is adapted to engage a corresponding surface on the cutting insert,
   wherein each bearing surface is adapted to engage a corresponding bearing surface on the cutting insert in a manner such that the cutting insert is pulled against the body when the rotary cutting tool is rotated about the tool axis, and
   wherein each recess further comprises a supplemental bearing surface inclined relative to the tool axis opposite the respective bearing surface, wherein each supplemental bearing surface is adapted to engage a corresponding supplemental bearing surface on the cutting insert.

8. The tool shank of claim 7 wherein each recess further comprises a transitional area disposed between the respective bearing surface and supplemental bearing surface.

9. The tool shank of claim 8 wherein the transitional area comprises a rounding.

10. The tool shank of claim 8 wherein the transitional area is adapted to not contact the cutting insert when the cutting insert is received in the tip portion of the body.

11. The tool shank of claim 7 wherein:
   each bearing surface, relative to the tool axis, extends over a first height of contact;
   each supplemental bearing surface, relative to the tool axis, extends over s second height of contact; and
   the first height of contact exceeds the second height of contact by approximately 50%.

12. The tool shank of claim 7 wherein:
   each bearing surface is inclined relative to the tool axis at a first angle; and
   each supplemental bearing surface is inclined relative to the tool axis at a second angle less than the first angle.

13. The tool shank of claim 12 wherein the first angle is about 30° and the second angle is about 20°.

14. A tool shank for use with a cutting insert in a rotary cutting tool, the tool shank comprising:
   a body having, and adapted to be rotated about, a central longitudinal tool axis, the body having a tip portion structured to receive at least a portion of the cutting insert therein;
   a pair of chip flutes formed in the body; and
   a pair of recesses, each recess bordering a respective chip flute, each recess having:
      a rim portion extending perpendicular to the tool axis, and
      a bearing surface extending at an incline relative to the tool axis,
   wherein each rim portion is adapted to engage a corresponding surface on the cutting insert,
   wherein each bearing surface is adapted to engage a corresponding bearing surface on the cutting insert in a manner such that the cutting insert is pulled against the body when the rotary cutting tool is rotated about the tool axis, and
   wherein each bearing surface is inclined at an angle of at least 15° and at most 60° with respect to the tool axis.

15. The tool shank of claim 7 wherein each supplemental bearing surface is inclined at an angle in the range of between 10° and 60° with respect to the tool axis.

* * * * *